April 18, 1944.    E. MARTIN    2,346,856

INERTIA ACTUATED PROPELLER CONTROL VALVE

Filed April 24, 1941    2 Sheets-Sheet 1

INVENTOR
Erle Martin
BY
Harris G. Luther
ATTORNEY

April 18, 1944. E. MARTIN 2,346,856
INERTIA ACTUATED PROPELLER CONTROL VALVE
Filed April 24, 1941 2 Sheets-Sheet 2
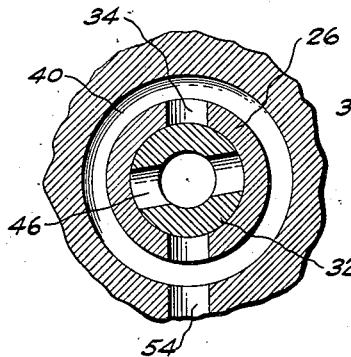
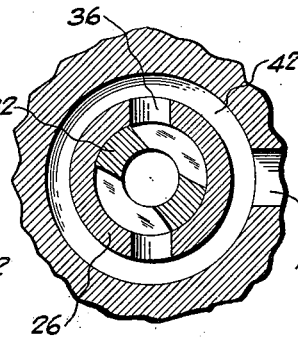
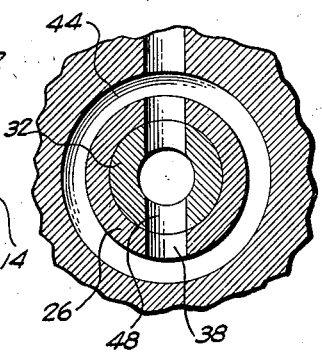
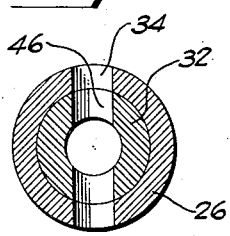
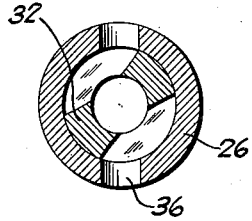
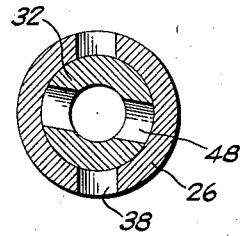
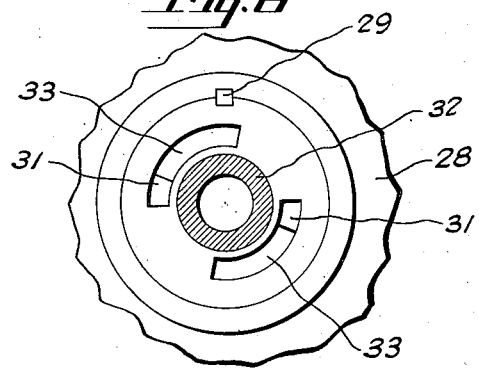
INVENTOR
Erle Martin
BY
Harris G. Luther
ATTORNEY Patented Apr. 18, 1944

2,346,856

UNITED STATES PATENT OFFICE 2,346,856

INERTIA ACTUATED PROPELLER CONTROL VALVE

Erle Martin, West Hartford, Conn., assignor to United Aircraft Corporation, East Hartford, Conn., a corporation of Delaware Application April 24, 1941, Serial No. 390,077

10 Claims. (Cl. 170—163)

This invention relates to improvements in control means for governor controlled controllable-pitch propellers and has particular reference to a device for anticipating the pitch controlling action of the governor under certain conditions of propeller speed variation.

An object of the invention resides in the provision, in combination with a controllable-pitch propeller and a governor for controlling the propeller pitch, of a device for preventing excessive overspeeding of the propeller when the propeller speed is abruptly accelerated.

A further object resides in the provision, in combination with a controllable-pitch propeller and a pitch controlling speed responsive governor, of an acceleration responsive device for supplementing the operation of the governor in controlling the pitch of the propeller.

Other objects and advantages will be more particularly pointed out hereinafter or will become apparent as the description proceeds.

In the accompanying drawings, in which like reference numerals are used to designate similar parts throughout, there is illustrated a suitable mechanical embodiment for the purpose of disclosing the invention. The drawings, however, are for the purpose of illustration only and are not to be taken as limiting or restricting the invention since it will be apparent to those skilled in the art that various changes in the illustrated construction may be resorted to without in any way exceeding the scope of the invention.

In the drawings,

Fig. 2 is a transverse sectional view on the line 2—2 of Fig. 1 showing the position of the parts when in their neutral or inoperative position.

Fig. 3 is a transverse sectional view on the line 3—3 of Fig. 1 showing the position of the parts when in their neutral or inoperative position.

Fig. 4 is a transverse sectional view on the line 4—4 of Fig. 1 showing the position of the parts when in their neutral or inoperative position.

Fig. 5 is a transverse sectional view similar to Fig. 2 showing the position of the parts when in their operative position.

Fig. 6 is a transverse sectional view similar to Fig. 3 showing the relation of the parts when in their operative position.

Fig. 7 is a transverse sectional view similar to Fig. 4 showing the relative position of the parts when in their operative position, and Fig. 8 is a transverse sectional view on the line 8—8 of Fig. 1.

Figures 1, 1A:
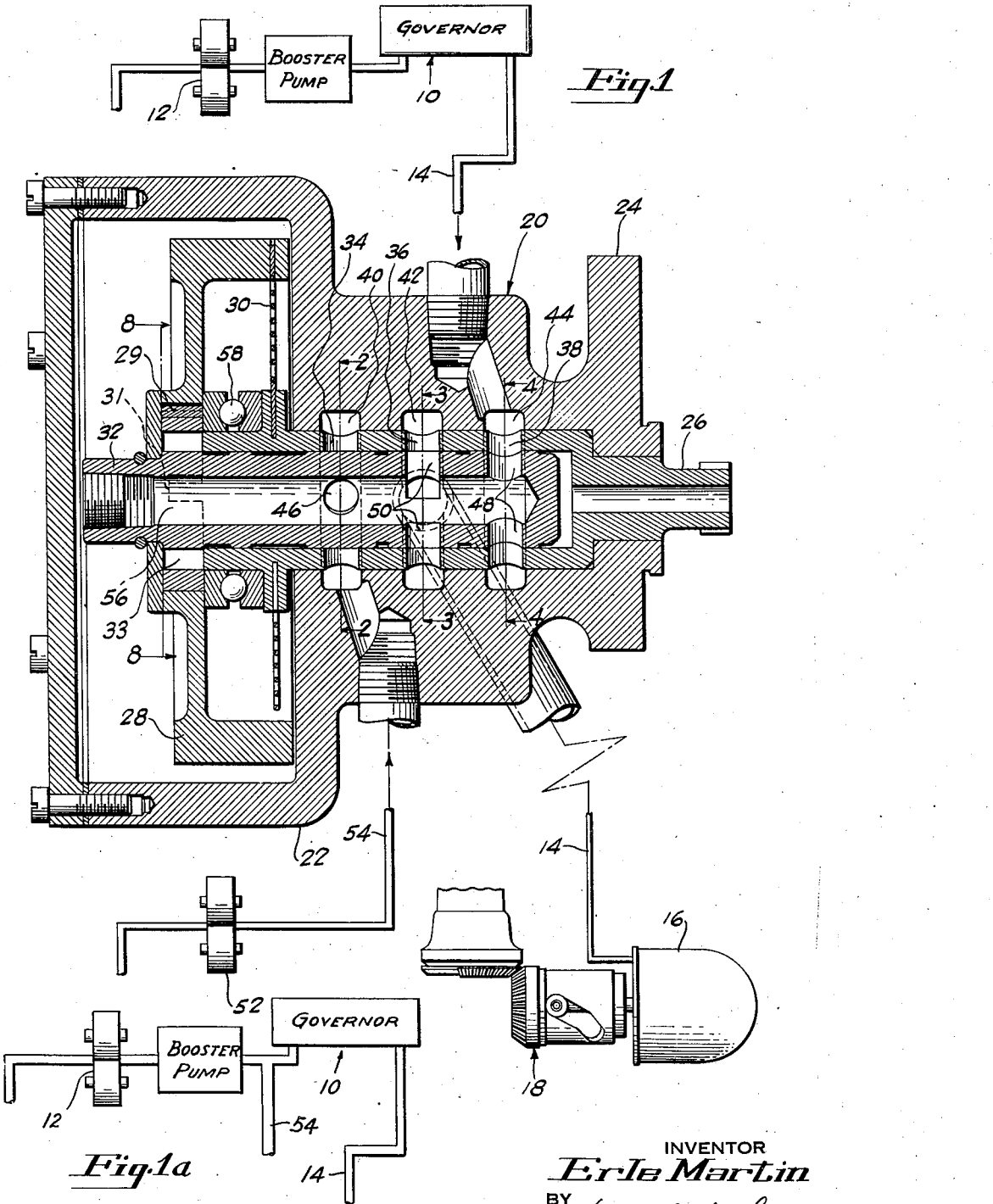
Fig. 1 is a longitudinal cross-sectional view of a governor anticipating device constructed according to the invention, the connection of the device with a governor and a controllable-pitch propeller being schematically illustrated.
Fig. 1a is a schematic view of an alternative arrangement of the booster pump.

Referring to the drawings in detail, the numeral 10 generally indicates an engine driven speed responsive governor which is schematically shown in the drawings but may be any of various forms well known to the prior art. A suitable governor is particularly illustrated and described in United States Patent No. 2,204,640, issued June 18, 1940, to Elmer E. Woodward, for Governor mechanism. This governor is supplied with hydraulic fluids from some suitable source such as the engine lubricating pump 12 and may include a booster pump for raising the oil pressure above the pressure at the outlet of the lubricating pump 12. The governor outlet is connected through a fluid line 14 with one side of the pitch changing motor 16 of a controllable-pitch propeller generally indicated at 18. The propeller indicated generally at 16 may be of any of several forms well known to the prior art, a suitable form being particularly illustrated and described in United States Patent No. 2,174,717, issued October 3, 1939, to Frank W. Caldwell, Erle Martin and John E. Anderson, for Multiposition controllable pitch propeller.

This propeller is so arranged that application by the governor of hydraulic fluid to one side of the pitch changing motor will operate the motor to increase the propeller pitch while a governor action relieving this pressure will permit the pitch to decrease.

Intercepting the line 14 between the governor and the propeller there is an acceleration responsive propeller pitch control device, generally indicated at 20. The device 20 comprises a casing 22 having a base or pad portion 24 adapted to be mounted upon the propeller driving engine, an engine driven drive shaft 26 extending through a bore in the base 24 and the portion of the casing adjacent thereto and into a chamber provided in the end of the casing opposite the base, an inertia member 28 driven by the shaft 26 through the intermediacy of a resilient connection in the form of a spring 30, and a valve member 32 rigidly secured to the inertia member 28 by means including the key 29 and extending through an enlarged tubular portion of the drive shaft 26. The spring 30 resiliently retains the members 26 and 32 in the relative position in which the tongues 31 on the member 26 projecting into the slots 33 in the member 32 are held at one end of the respective slots and acts as positive limit stops for determining the normal relative position of these two members.

The drive shaft 26 is provided with three sets of longitudinally spaced ports 34, 36 and 38 and the casing 22 is provided with corresponding annular chambers 40, 42 and 44 surrounding these ports. The valve member 32 is provided with ports 46 positioned to register with the ports 34 when the device is rendered operative to anticipate the action of the governor, with ports 48 positioned to normally register with the ports 38, and with elongated ports or cut-away portions 50 which register at all times with the ports 36. The governor end of the line 14 is connected with the annular chamber 44 leading to the ports 38 and 48 and the propeller end of this line is connected with the chamber 42 and the ports 36 and cut-away portion 50 of the valve member. A source of fluid under high pressure, such as the pump 52, which may be, as shown in Fig. 1a, the governor booster pump shown in the Woodward patent referred to above, is connected through a fluid line 54 with the chamber 40 and the ports 34 and 46. The valve member 32 is closed at both ends and provided with an internal bore 56 which connects the various sets of ports 48, 50 and 46 provided therein. This member is rotatable relative to the drive shaft upon rotation of the inertia member 28 relative to the drive shaft to change the registry of the ports 46 and 48 in the valve member with the corresponding ports 34 and 38 in the drive shaft. This relative rotation of the valve member 32 with respect to the drive shaft 26 is provided for by the flexibility of the elastic coupling 30 and may be facilitated by the provision of an anti-friction bearing, such as indicated at 58, between the inertia member and the drive shaft.

*Operation*

When the engine and propeller are operating within a predetermined range of torsional acceleration the governor anticipator remains inoperative and the drive shaft 26 and drive member 32 occupy the relative position particularly shown in Figs. 1, 2, 3 and 4 located by contact of the tongues 31 with the ends of the slots 33 to which they are resiliently urged by the spring 30. In the relative position of the drive shaft and valve member indicated, the ports 46 are out of registry with the ports 34, as is particularly illustrated in Fig. 2, so that the high pressure fluid line 54 leading to the anticipator is blocked, the ports 36 remain open, as is particularly illustrated in Fig. 3, and the ports 48 register with the ports 38 so that the governor end of the fluid line 14 is connected with the internal bore 56 of the valve member and through this bore and the ports 36 with the propeller end of the line 14. Thus, when the engine and propeller are operating within the predetermined range of torsional acceleration mentioned above, the speed responsive governor is continuously connected with the propeller to control the same in accordance with the constant speed setting of the governor and the acceleration responsive device does not affect the propeller pitch. If, however, the predetermined range of torsional accelerations is exceeded in a positive direction, i. e., if the speed suddenly increases, the spring 30 will wind up to a certain extent thereby permitting the drive shaft 26 to rotate relative to the inertia member 28 and the valve member 32. This relative rotation will bring the drive shaft and the valve member to the relative position particularly illustrated in Figs. 5, 6 and 7 in which the ports 46 and 34 are brought into registry and the ports 48 and 38 are moved out of registry thereby blocking off the governor end of the fluid line 14. With this relative position of the parts 26 and 32 the line 54 is connected through the ports 34 and 46 and the ports 36, which remain open as is particularly shown in Fig. 6, with the propeller end of the fluid line 14 thereby permitting an injection of high pressure fluid from the pump 52 to the pitch increasing side of the propeller pitch changing motor. This abrupt injection of pressure fluid into the pitch changing motor will immediately increase the propeller pitch and reduce the speed of the engine and propeller a considerable time before the governor would have had time to accomplish this purpose. The exact valve port sizes will be determined by practical considerations.

With this arrangement the speed responsive governor corrects the speed variations of the engine-propeller combination, and may do so at a pace which is sufficiently slow to avoid abrupt changes and overshooting of the propeller pitch changes with consequent hunting operating of the control mechanism, while the acceleration responsive device will retard abrupt changes in the speed of the engine-propeller combination which would place undue strains on the propeller and the engine or which might result in serious overspeeding of the combination in the event the engine throttle was suddenly moved from a relatively retarded position to a high power output position.

While a suitable mechanical arrangement has been hereinabove described and illustrated in the accompanying drawings for the purpose of disclosing the invention, it is to be understood that the invention is not limited to the particular arrangement so illustrated and described but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. In combination with a hydro-controllable propeller, a speed responsive hydraulic governor for controlling the pitch changes of said propeller, a fluid line between said governor and said propeller, and a source of fluid under pressure, an acceleration responsive device intercepting said fluid line between said governor and said propeller and having a connection with said source of fluid under pressure, said acceleration responsive device comprising, a drive shaft, a rotatable valve member operatively associated with said drive shaft, a rotatable inertia member carried by said drive shaft and connected with said valve member, a flexible connection between said drive shaft and said inertia member, and registerable ports in said drive shaft and said valve member operative to maintain said governor connected with said propeller as long as the rate of change of propeller speed does not exceed a predetermined limit and to disconnect said governor from said propeller and connect said propeller directly with said source of fluid under pressure if said predetermined limit is exceeded.

2. An acceleration responsive speed controlling device comprising, a hollow drive shaft having fluid passage ports therethrough, a hollow valve member in said drive shaft having ports registerable with the ports in said drive shaft said ports being divided into three sets only two of which can be brought into registry at the same time, an inertia member connected with said valve member, and a flexible spring driving connection between said drive shaft and said inertia member whereby said valve member may rotate relative to said drive shaft under the influence of acceleration forces to change the registry of said ports when said acceleration forces exceed a predetermined limit.

3. In a power plant speed control apparatus, a power actuated speed varying device, a first power line leading to said device, a device actuated by power plant acceleration forming part of said first power line, a speed governor also intercepting said first power line and normally controlling the operation of said speed varying device, a second power line leading to said acceleration actuated device, said acceleration actuated device normally maintaining said second power line closed but actuated by acceleration when the power plant acceleration exceeds a predetermined value to connect said second power line with said speed varying device and bypass said governor.

4. In a power plant speed control apparatus, a power actuated speed varying device, and means for controlling said speed varying device comprising a first power line, a speed governor intercepting said first power line and normally controlling the operation of said speed varying device, a second power line, and an acceleration responsive device connected with said speed varying device and intercepting both of said power lines operative to maintain said first power line opened and said second power line closed as long as the power plant acceleration remains below a predetermined value within the regulatory capacity of said speed governor, and to close said first power line and open said second power line whenever the power plant acceleration exceeds said predetermined value.

5. In combination with a load varying device operative to change the speed of a power plant, and a centrifugal governor device driven at a speed proportional to the speed of said load varying device and operative to control the load varying action of said load varying device to maintain the speed of said device substantially constant, an acceleration responsive inertia device separate from said governor, responsive to acceleration of said load varying device, and interposed between said governor and said load varying device and operative at values of acceleration of said load varying device above a predetermined value, and means operated by said inertia device to temporarily disconnect said centrifugal governor and separately control said load varying device.

6. In a speed control apparatus for a power plant including a controllable-pitch propeller, means for controlling said propeller comprising, a motor carried by said propeller and operative to change the propeller pitch, a first power line, a speed governor for controlling the operation of said motor intercepting said first power line, a second power line, and an acceleration responsive device connected with said propeller and intercepting both of said power lines operative to maintain said first power line open and said second power line closed as long as the power plant acceleration remains below a predetermined value within the regulatory capacity of said speed governor and to close said first power line and open said second power line whenever the power plant acceleration exceeds said predetermined value.

7. In a speed control apparatus for a power plant including a controllable-pitch propeller, a fluid motor carried by said propeller and operative to change the propeller pitch, a first pressure fluid line leading to said motor, a speed governor intercepting said first pressure fluid line and controlling the operation of said motor, a second pressure fluid line, and an acceleration responsive device intercepting both of said pressure fluid lines operative to maintain said first pressure fluid line open and said second pressure fluid line closed as long as the power plant acceleration remains below a predetermined value within the regulatory capacity of said speed governor and to close said first pressure fluid line and connect said second pressure fluid line with said propeller whenever the power plant acceleration exceeds said predetermined value, and means for supplying fluid under pressure to each of said pressure fluid lines.

8. In a speed control for a power plant, a load varying device operative to control the power plant speed, a first source of power connected with said load varying device, a speed governor interposed between said first power source and said load varying device, a second source of power, and an acceleration actuated device interposed between said speed governor and said load varying device and between said second power source and said load varying device and operative upon a change in power plant speed in excess of a predetermined rate to discontinue the connection between said speed governor and said load varying device and open a connection between said second power source and said load varying device to vary the load and oppose the change in speed.

9. In combination, a controllable-pitch propeller, a speed responsive governor operatively connected with said propeller for normally controlling the pitch of said propeller to maintain substantially constant propeller speed, a source of power, acceleration actuated mechanism, connected with said source of power, located in the connection between said governor and said propeller, and operable by acceleration of said propeller above a predetermined amount to disconnect said governor from said propeller and to connect said source of power with said propeller to check said acceleration by increasing the propeller pitch.

10. In combination, a controllable-pitch propeller, a speed responsive governor operatively connected with said propeller for normally controlling the pitch of said propeller to maintain substantially constant propeller speed, a source of power, means connecting said source of power with said propeller comprising acceleration actuated mechanism having means normally blocking the connection between said source of power and said propeller, and operable by acceleration of said propeller above a predetermined amount to disable said blocking means and connect said source of power with said propeller to directly control said propeller and temporarily discontinue the control operation of said governor.

ERLE MARTIN.